US012473626B2

(12) United States Patent
Antolotti et al.

(10) Patent No.: US 12,473,626 B2
(45) Date of Patent: Nov. 18, 2025

(54) PLASMA SPRAY APPARATUS AND METHOD

(71) Applicant: LINCOTEK TRENTO S.P.A., Pergine Valsugana (IT)

(72) Inventors: Nelso Antolotti, Pergine Valsugana (IT); Girolamo Coppelletti, Ramiola di Madesano (IT)

(73) Assignee: LINCOTEK TRENTO S.P.A., Pergine Valsugana (IT)

( * ) Notice: Subject to any disclaimer, the term of this patent is extended or adjusted under 35 U.S.C. 154(b) by 177 days.

(21) Appl. No.: 17/226,607

(22) Filed: Apr. 9, 2021

(65) Prior Publication Data

US 2021/0230731 A1 Jul. 29, 2021

Related U.S. Application Data

(62) Division of application No. 16/310,900, filed as application No. PCT/IB2017/055628 on Sep. 18, 2017, now Pat. No. 11,021,781.

(51) Int. Cl.
*C23C 4/137* (2016.01)
*B05B 7/14* (2006.01)
(Continued)

(52) U.S. Cl.
CPC ................ *C23C 4/137* (2016.01); *B05B 7/14* (2013.01); *B05B 7/22* (2013.01); *B05B 7/222* (2013.01); *C23C 4/134* (2016.01); *H05H 1/28* (2013.01)

(58) Field of Classification Search
CPC .......... H05H 1/28; C23C 4/137; C23C 4/134; B05B 7/22; B05B 7/222; B05B 7/14;
(Continued)

(56) References Cited

U.S. PATENT DOCUMENTS 711,419 A * 10/1902 Dyer ...................... F25J 1/0012 62/615
3,039,274 A * 6/1962 Matsch ................ F25J 3/04412 62/913

(Continued)

FOREIGN PATENT DOCUMENTS

| | | |
|---|---|---|
| EP | 0124432 | 11/1984 |
| EP | 0375914 | 7/1990 |
| FR | 2808808 | 11/2001 |

*Primary Examiner* — Katherine A Bareford
(74) *Attorney, Agent, or Firm* — Tutunjian & Bitetto, P.C.

(57) ABSTRACT

Plasma spray apparatus for coating substrates, including at least a working chamber including a plasma torch and at least a substrate support, in which an inert gas or a mixture of inert gases is contained at a pressure which is close to the normal pressure, and at least a gas circuit, in communication with said working chamber, including recirculating means of the inert gases contained in said working chamber. The recirculating means include a closed loop, including a blower and a first heat exchanger communicating with said working chamber for extracting the inert gases and supplying a first fraction of the cooled inert gases back into a first portion of the working chamber, and at least a path, communicating with said closed loop and including a compressor and a second heat exchanger for supplying a second fraction of the cooled inert gases into a second portion of the working chamber.

10 Claims, 2 Drawing Sheets

(51) Int. Cl.

| | |
|---|---|
| ***B05B 7/22*** | (2006.01) |
| ***C23C 4/134*** | (2016.01) |
| ***H05H 1/28*** | (2006.01) |

(58) Field of Classification Search
CPC ......... B05B 7/226; B05B 16/60; B05B 12/12; B05B 13/0442; B05B 13/0431
See application file for complete search history.

(56) References Cited

U.S. PATENT DOCUMENTS

| | | | | |
|---|---|---|---|---|
| 4,328,257 | A | 5/1982 | Muehlberger et al. | |
| 4,596,718 | A | 6/1986 | Gruner | |
| 4,845,334 | A * | 7/1989 | Stocks | B01D 50/00 219/121.49 |
| 5,250,780 | A * | 10/1993 | Hansz | H01J 37/20 219/121.48 |
| 6,357,386 | B1 | 3/2002 | Keller | |
| 6,746,225 | B1 * | 6/2004 | McHugh | B22F 9/082 425/375 |
| 6,759,085 | B2 * | 7/2004 | Muehlberger | C23C 24/04 427/191 |
| 2006/0032441 | A1 * | 2/2006 | Clark | C23C 4/137 427/248.1 |
| 2007/0054062 | A1 * | 3/2007 | Imaizumi | C23C 4/02 427/446 |
| 2007/0186848 | A1 * | 8/2007 | Ladru | C23C 4/134 118/620 |
| 2016/0200987 | A1 * | 7/2016 | Appel | B01J 19/0006 585/350 |

* cited by examiner

PLASMA SPRAY APPARATUS AND METHOD

CROSS-REFERENCE TO RELATED APPLICATIONS

This is a division of application Ser. No. 16/310,900 filed Dec. 18, 2018, now U.S. Pat. No. 11,021,781, the entirety of which is incorporated herein by reference.

TECHNICAL FIELD OF THE INVENTION

This invention relates to a plasma spray apparatus and method.

BACKGROUND ART

Thermal spraying techniques are coating processes in which melted or heated materials are sprayed onto a surface, also called substrate.

The feedstock, that is the coating precursor, is heated by electrical or chemical means.

Plasma spray process is a sub-class of thermal spraying, in which the feedstock in form of a powder is heated by a plasma jet, emanating from a plasma torch.

In the plasma jet, where the temperature is on the order of 10'000 K, the material is melted and propelled towards a substrate.

There, the molten droplets flatten, rapidly solidify and form a deposit, layer after layer.

The plasma is formed from the continuous input of a working gas, subjected to high current discharge. Usually the working gas is constituted by nitrogen, hydrogen, helium, argon or a mixture of these.

Plasma spray processes can be categorized by the spraying environment.

Air plasma spraying (APS) is performed in air, under normal pressure.

Vacuum plasma spraying (VPS) and low-pressure plasma spraying (LPPS) are performed in an inert gas environment inside a sealed chamber at low pressure, for example 0.05-0.25 bar, or even lower.

Examples of such processes are disclosed in U.S. Pat. No. 4,596,718, which refers to a vacuum plasma coating apparatus comprising a plasma torch arranged in a low pressure chamber.

U.S. Pat. No. 4,328,257 discloses a supersonic plasma stream and a transferred arc system in order to obtain high strength coatings; the pressure in the plasma chamber is held, by means of vacuum pumps, in the range of 0.6 bar, and down to 0.001 bar.

U.S. Pat. No. 6,357,386 discloses another plasma spraying apparatus working at sub-atmospheric pressure in inert gas, comprising an assembly for controlling the gas flow inside the treatment chamber.

When compared to APS process, VPS and LPPS processes produce coatings of higher mechanical strength, thanks to the absence of oxygen in their environment.

As it is known, oxygen is a very reactive element which oxidizes the heated feedstock and introduces brittle phases in the metallic matrix; similarly, and depending on the elements that constitutes the feedstock, also nitrogen can cause an embrittlement of the coating.

Therefore, VPS and LPPS coatings possess higher adhesion to the substrate, higher cohesion, higher resistance against wear; furthermore, VPS and LPPS processes can be used to produce coatings with higher thickness than those obtained by APS process, and also to produce highly porous coatings but still mechanically very strong.

All plasma spray processes generate a lot of heat because of the plasma jet: in order not to overheat the substrate and cause thermal damage, it is necessary to provide a proper cooling system: the latter consists of one or more ducts in which a cooling gas is blown toward the substrate with a high flow rate.

The cooling system limits the temperature reached by the substrate; if not properly cooled, high thermal stresses arise within the substrate and within the coating, which may negatively affect the mechanical strength and the fatigue resistance, or induce deformation in the final coated object.

In view of the above considerations, VPS and LPPS processes are disadvantageous compared to APS processes, essentially because of two reasons.

Firstly, the plasma jet generated in low pressure conditions reaches much higher temperature.

Secondarily, in case of a low-pressure environment the flow rate of the cooling medium cannot be as high as in case of a normal-pressure environment, otherwise the pressure inside the working chamber would rise.

Furthermore, the cooling medium has to be an inert gas: in many cases argon can be used, but it has a lower cooling capacity than air and therefore the cooling efficiency of argon-cooled VPS processes is lower than APS-processes.

Helium is another inert gas suitable for such scope: its cooling capacity is higher than air, but it is a very expensive gas and it makes the process less cost-effective.

Consequentially the substrate, and also the supports (which grab and hold the object in place) and the masking tools (which cover those parts of the surface which must not be coated) get heated more rapidly.

With this regard, the cost-effective silicone masking tapes currently used in APS processes are not utilizable in VPS processes, and they are more expensive: metallic masking covers must be used.

An easy way for limiting and maintaining the temperature of the substrate under control is to set long pauses between depositing one layer of coating and the next one; this increases, however, the coating process duration and lowers the productivity. Other methods of maintaining the temperature on a low, controlled level are related to the use of refrigerating gases.

For example, EP 0124432 discloses a process of spraying droplets of liquefied argon or liquefied nitrogen for cooling parts subjected to plasma spray coating on a controlled atmosphere.

FR 2808808 discloses a method where the temperature of the part to be coated is maintained at 300° C., preferably 100-200° C., by cooling with a carbon dioxide or argon jet at 20-60 bar pressure, and/or at a flow rate of 10-300 kg/h.

EP 0375914 discloses a method for plasma spray coating of fiber-reinforced plastics by means of a carbon dioxide, argon or nitrogen jet, at a pressure of 60 bar, keeping temperature below 150° C.

All the above-disclosed methods are effective regarding temperature control, but they are very expensive due to the high amount of the required cooling gas.

Carbon dioxide is also not compatible with metal substrates coating, since it can lead to oxidization.

SUMMARY OF THE INVENTION

The technical aim of the present invention is to improve the state of the art in the field of coating processes.

Within such technical aims, it is an object of the present invention to provide a plasma spraying apparatus and method capable of producing high quality coatings, comparable to those obtained with VPS and LPPS processes, but with a better control and limitation of the temperature reached by the substrates.

A further object of the present invention is to provide a plasma spraying apparatus and method capable of producing high quality coatings, comparable to those obtained with VPS and LPPS processes, but with a higher productivity.

This aim and these objects are all achieved by the plasma spray apparatus according to the present application.

The plasma spray apparatus comprises at least a working chamber, including at least a plasma torch and at least a substrate support for the substrate to be coated, in which an inert gas or a mixture of inert gases is contained at a pressure which is close to, or higher than, the normal pressure.

The apparatus further includes at least a gas circuit, in communication with the working chamber, comprising recirculating means of the inert gases contained in the same working chamber.

According to an aspect of the invention, the recirculating means comprise at least one closed loop, including a first heat exchanger for cooling down the inert gases, communicating with the working chamber and suitable for extracting the inert gases from the working chamber and supplying a first fraction of the same inert gases back into a first portion of the working chamber.

The recirculating means further include at least a path, communicating with the closed loop and including a second heat exchanger for further cooling down the gases, and a compressor for increasing the pressure of the gases, suitable for supplying a second fraction of the cooled inert gases into a second portion of said working chamber, pointed towards the substrate by means of properly placed conduits.

This aim and these objects are also all achieved by the plasma spray method according to the present application.

The plasma spray method for coating substrates comprises the steps of providing at least a working chamber including at least a plasma torch and at least a substrate support for the substrate to be coated, in which an inert gas or a mixture of inert gases is contained at a pressure which is close to, or higher than, the normal pressure, and providing at least a gas circuit, in communication with the working chamber, comprising recirculating means of the inert gases contained in the working chamber.

According to the invention, the method further comprises the steps of supplying a first fraction of the recirculated and cooled inert gases into a first portion of the working chamber, and of supplying a second fraction of recirculated, compressed and further cooled, inert gases into a second portion of the working chamber, pointed toward the substrate by means of properly placed conduits.

The present application refers to preferred and advantageous embodiments of the invention.

BRIEF DESCRIPTION OF THE DRAWINGS

These and further advantages will be better understood by the skilled person from the following detailed description and from the enclosed drawings, given as a non-limiting example, in which.

DETAILED DESCRIPTION OF THE INVENTION

Figure 1:
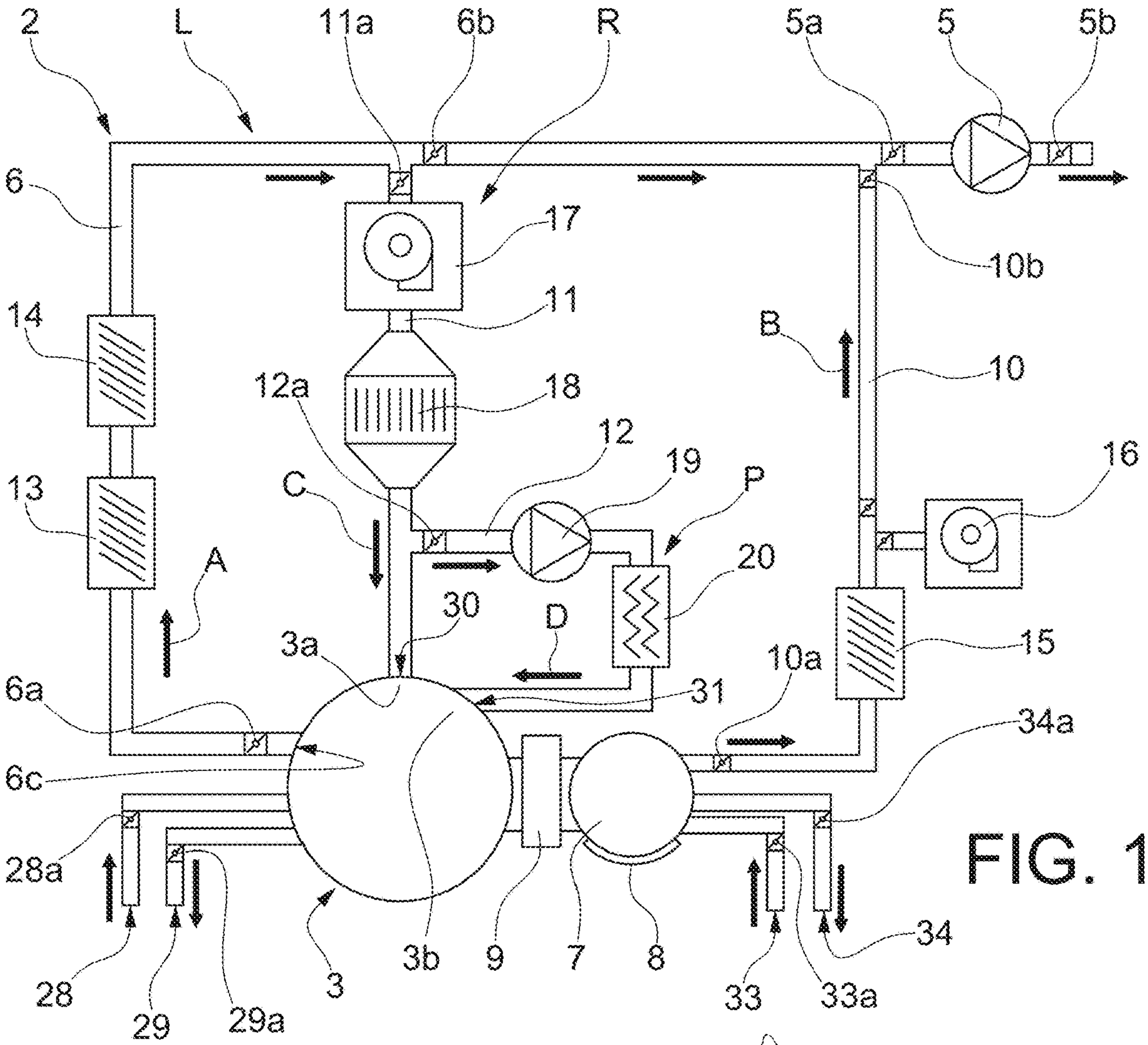
FIG. 1 is a simplified schematic illustration of the plasma spray apparatus according to the present invention.

With reference to FIG. 1, reference number 1 overall indicates a plasma spray apparatus according to the present invention.

The apparatus 1 includes a main control unit (not shown in the drawings): the main control unit manages and controls the operation of the apparatus.

The apparatus 1 comprises a gas circuit, wholly indicated with 2.

As it will become clearer hereinafter, the gas circuit 2 includes all the necessary components and communication means in order to achieve the desired effects in the plasma spraying process according to the present invention.

The apparatus 1 further includes a working chamber, wholly indicated with 3. Inside the working chamber 3 the spraying process takes place; such process will be better disclosed hereafter.

The gas circuit 2 includes recirculating means R of the inert gases contained in the working chamber 3.

The recirculating means R, in particular, perform a cooling action on the inert gases contained in the working chamber, for the reasons better disclosed hereafter.

The gas circuit 2 includes a first branch 4.

The first branch 4 includes at least a vacuum pump 5.

As shown in FIG. 1, the vacuum pump 5 is arranged along the first branch 4 and it is interposed between two respective valves **5*a*,5*b***.

The gas circuit 2 further includes a second branch 6; the second branch 6 connects the working chamber 3 to the first branch 4.

By the ends of the second branch 6 two respective valves **6*a*,6*b*** are provided.

According to an aspect of the present invention, the apparatus 1 further includes at least a pass-through chamber 7.

The pass-through chamber 7 communicates with the working chamber 3; the pass-through chamber 7 is used for loading or unloading the substrates, or objects.

The pass-through chamber 7 comprises a respective door 8.

The door 8 can be used by the operator for loading or unloading substrates or objects, manually or automatically.

The apparatus 1 includes a gate 9, which puts the working chamber 3 and the pass-through camber 7 in communication.

As it will become clear later, the presence of the pass-through chamber 7 increases the productivity of the plasma spray process.

In fact, by means of the pass-through chamber 7 the operator can replace the coated objects with new objects, while the spraying process is running.

Furthermore, it is not necessary to change/replace the atmosphere of the working chamber 3, but solely the one contained in the pass-through chamber 7, which has a much smaller volume.

The gas circuit 2 includes a third branch 10; the third branch 10 puts the pass-through chamber 7 in communication with the first branch 4.

By the ends of the third branch 10 two respective valves 10*a*,10*b* are provided.

According to an aspect of the present invention, the recirculating means R of the inert gases include a fourth branch 11.

The fourth branch 11 puts the working chamber 3 in communication with the first branch 4, and it is substantially parallel (at least from the functional point of view) to the second branch 6, so as to define a closed loop L.

The second branch 6 (and therefore the closed loop L) communicates with the working chamber 3 by means of a recirculation outlet 6*c*.

The fourth branch 11 comprises a respective inlet valve 11*a*.

The recirculating means R further includes a fifth branch 12; the fifth branch 12 connects the fourth branch 11 to the working chamber 3, along a path P.

The fifth branch 12 comprises a respective inlet valve 12*a*.

Inlet valve 12*a* allows at least a portion of the gas flowing through the fourth branch 11 to flow through the fifth branch 12.

The second branch 6 comprises at least one filter 13,14; more in detail, the second branch 6 comprises a first filter 13 and a second filter 14.

The first filter 13 and the second filter 14 are suitable to be traversed by the gases extracted from the working chamber 3, in the direction indicated by the first arrow A in FIG. 1.

More in detail, the first filter 13 is a coarse filter, and the second filter 14 is a fine filter.

The third branch 10 comprises a respective third filter 15, and a first blower 16.

The third filter 15 and the first blower 16 are arranged in such a way that they are traversed by the gases along the direction indicated by the second arrow B in FIG. 1.

The fourth branch 11 includes a second blower 17, and a first heat exchanger 18.

The second blower 17 and the first heat exchanger 18 are arranged in such a way that they are traversed by the gases along the direction indicated by the third arrow C in FIG. 1.

The fifth branch 12 comprises a compressor 19, and a second heat exchanger 20.

The compressor 19 and the second heat exchanger 20 are arranged in such a way that they are traversed by the gases along the direction indicated by the fourth arrow D in FIG. 1.

Figure 2:
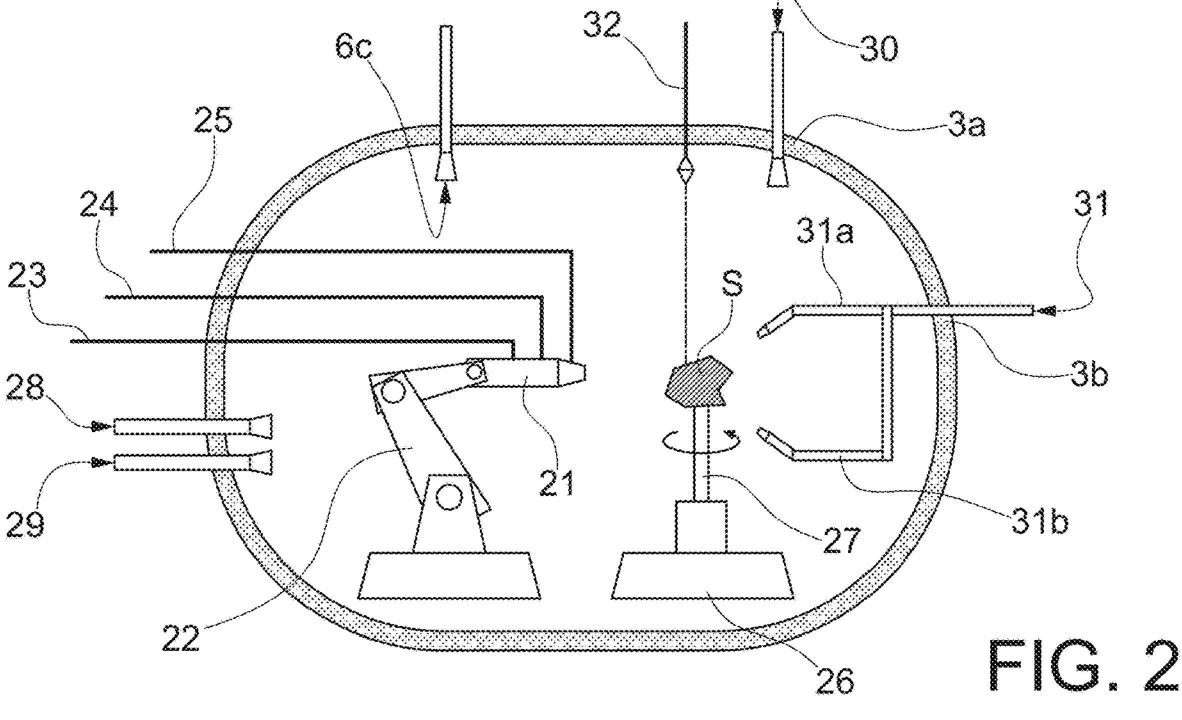
FIG. 2 is a simplified schematic illustration of the working chamber of the plasma spray apparatus according to the present invention.

With reference to FIG. 2, the working chamber 3, in which the plasma spray process takes place, includes at least a plasma torch 21.

As better explained hereafter, the plasma torch 21 is suitable to generate a plasma jet which is pointed towards the substrate S.

The working gas used to generate such plasma jet is a mixture of inert gases only.

In an embodiment of the invention of particular practical interest, the working gas is a mixture of argon and helium.

The working chamber 3 further includes a robot 22, for handling the plasma torch 21.

The robot 22 is arranged inside the working chamber 3.

The plasma torch 21 comprises a plasma torch power supply 23, a plasma working gas inlet 24, and a feedstock inlet 25 (in form of powder).

The working chamber 3 includes a substrate support 26.

The substrate support 26 is suitable to rotate the substrate S around at least a rotation axis 27, in order to orientate any portion of the support S towards the plasma torch 21.

The working chamber 3 includes an inert gas inlet 28, and an inert gas outlet 29, operated by respective valves 28*a*,29*a*.

The inert gas outlet 29 is opened whenever there is the need to reduce the pressure inside the working chamber 3.

According to an aspect of the present invention, the working chamber 3 further includes a first cooled inert gas inlet 30, for the introduction of a first fraction of cooled inert gases.

According to another aspect of the present invention, the working chamber 3 includes a second cooled inert gas inlet 31, for the introduction of a second fraction of cooled and compressed inert gas.

The second cooled inert gas inlet 31 communicates with at least one conduit 31*a*,31*b*, which is pointed toward the substrate S.

Other conduits can be added and connected to gas inlet 31 according to the needs.

In FIG. 2, two conduits 31*a* and 31*b* are shown as example.

The outlet nozzles of the conduits are pointed towards the substrate S with different orientations, according to the geometry of the substrate S itself.

The working chamber 3 further includes a temperature measuring means 32, for example a pyrometer, a thermo-camera, or the like.

The temperature measuring means 32 allow monitoring the temperature of the substrate S during the spraying process.

The temperature measuring means 32, connected to the main control unit of the apparatus 1, act as a control sensor that stops the spraying process in case of technical problems, for example in case of reaching a predetermined maximum temperature threshold.

The pass-through chamber 7 comprises an inert gas inlet 33, and an inert gas outlet 34, operated by respective valves 33*a*,34*a*.

As stated, the present invention provides an improved apparatus and method for plasma spray coating; in particular, the present invention provides for a plasma spray method in an inert gas environment with a recirculating and cooling system of the inert gas, which is highly advantageous over conventional air plasma spraying (APS), vacuum plasma spraying (VPS) and low-pressure plasma spraying processes (LPPS). The operation of the apparatus 1 according to the invention is as follows.

A substrate S to be coated is introduced into the working chamber 3 through the pass-through chamber 7.

The working chamber 3 and branches 6,11 and 12 are initially evacuated, as they are connected to the vacuum pump 5 through the first branch 4.

During this operation, valves 10*b*, 28*a*,28*b* and gate 9 are closed, while valves 5*a*,5*b*,6*a*,6*b*,11*a*,12*a* are open.

After being completely evacuated, the working chamber 3 and branches 6,11 and 12 are filled up—through the inert gas inlet 28—with an inert gas.

Before performing this operation valve 28*a* is opened, and valve 6*b* is closed. Such inert gas is preferably argon.

At the end of this phase, the gas inside the working chamber is at a pressure near to or higher than the normal pressure, preferably between 0.7 and 2.0 bar, even more preferably between 1.1 and 1.5 bar or 1.13 bar or 1.3 bar.

After closing valve 28*a*, the plasma torch 21 is put into operation; the inert gases of the working atmosphere, heated up by the plasma jet, and mixed with the smaller amount of the inert gases exiting the plasma torch, are continuously pumped out of the working chamber 3 by the recirculation means R.

The evacuated gases pass through the first branch 6, and therefore through the first filter 13 and the second filter 14, for eliminating solid particles.

Afterwards, the evacuated gases—aspirated by the second blower 17—pass through the fourth branch 11, and thus through the first heat exchanger 18 (which is a chiller).

Upon exiting the first heat exchanger 18, a first fraction of the inert gases, which may be for example at a temperature of 5-40° C., preferably 10-20° C., is supplied—through the first cooled inert gas inlet 30—into the working chamber 3 again, and it is used as a cooling and cleaning medium for the working atmosphere.

According to the invention, a second fraction of the inert gases exiting the first heat exchanger 18 is supplied into the working chamber 3 through the second cooled inert gas inlet 31.

Such second fraction of the inert gases is compressed (by compressor 19) in order to increase its pressure above 2 bar, preferably 6-8 bar.

Furthermore, such second (compressed) fraction of the inert gases is supplied to the second heat exchanger 20, and cooled down to a temperature below 40° C., preferably 10-20° C.

Upon exiting the second heat exchanger 20, the relatively cold second fraction of inert gases is supplied into the working chamber 3 again at a flow rate between 250 $Nm^3/h$ and 350 $Nm^3/h$ (normal-cubic meters per hour, or preferably between 280 $Nm^3/h$ and 320 $Nm^3/h$), and guided through the first and second conduits 31*a*,31*b* close to, and towards, the substrate S to be coated, acting as a cooling medium for the substrate itself.

The nozzles of the conduits 31*a*,31*b* are geometrically designed so that the flow rate of the cooled gas is further increased. A means for obtaining this is the use of so-called air amplifiers, or similar ejectors which increase the flow rate thanks to the Venturi effect. The inert gas is finally ejected towards the substrate at a final flow rate between 250 $Nm^3/h$ and 1000 $Nm^3/h$.

As stated, the working chamber 3 is connected to a smaller pass-through chamber 7, which is used for loading and unloading the substrates S, or objects in general.

From the operation point of view, the pass-through chamber 7 is initially in a normal ambient condition: the operator opens the door 8 and places the objects/substrates S to be coated into the pass-through chamber 7.

After the door 8 is closed, air in the pass-through chamber 7 is pumped off (through the third branch 10), and the same pass-through chamber 7 is back-filled—through the inert gas inlet opening 33—with the inert gas having the same composition of the one used for filling up the working chamber 3, at the same pressure of the working chamber 3.

Afterwards the gate 9 between the working chamber 3 and the pass-through chamber 7 is opened, the objects/substrates S to be coated are automatically moved into the working chamber 3; at the same time, the previously coated objects/substrates S are moved from the working chamber 3 to the pass-through chamber 7.

After the gate 9 closes, the pressure of the pass-through chamber 7 is reduced to normal pressure by opening the valve 34*a*.

At the same time, the spraying process starts in the working chamber 3.

When the pressure of the pass-through chamber 7 has reached the normal level, the operator is able to re-open the door 8, remove the coated objects/substrates S, and replace them with new objects/substrates S to be coated.

It is an object of the present invention also a plasma spray method including the operational phases above disclosed.

In an embodiment of the invention, the plasma spray method is performed by an apparatus 1 including the above disclosed features.

Application examples are referred to coatings for biomedical implants.

In fact, the present invention is particularly useful and advantageous to create high porous, high strength coatings on medical implant devices, such as prosthetic joints or spinal implants.

Such metallic porous coatings are useful for providing initial fixation of the implant immediately after surgery, but also serve to facilitate long-term stability by enhancing bone ongrowth/ingrowth: the high porosity is a key feature to guarantee the clinical success of the implant.

A high-porous, high-thickness coating on metal implant components can be obtained using a fine titanium powder of size 75-250 microns as a feedstock.

The substrate is usually made of titanium, stainless steel or chromium-cobalt alloy. The powder is delivered to the plasma spray gun by a flow of argon gas.

The plasma spray gun receives a controlled mixture of helium and argon as is powered by a power unit able to generate 25 kW.

The working chamber 3 is filled initially with argon at a pressure of 1.2-1.3 bar.

The first fraction of the recirculating inert gases is cooled down to 10-20° C. and supplied into the working chamber 3 again. The second fraction of the inert gases is compressed and cooled down to 10-20° C., and directed toward the metal substrate at a final flow rate of 600-800 $Nm^3/h$.

The highly-porous coating has a final thickness of 500-800 μm.

Figure 3:
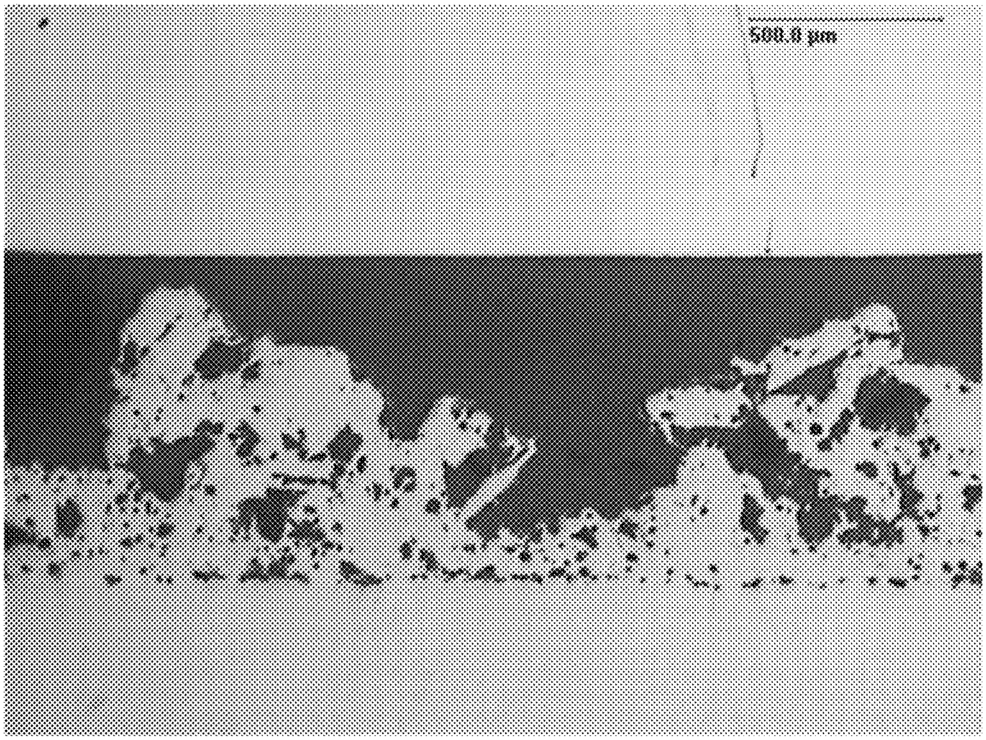
FIG. 3 is a cross-section micrograph of an application example of a metal coated object obtained by the apparatus and method according to the present invention.

FIG. 3 shows a cross-section micrograph of a metal object coated according to these conditions.

A second example (FIG. 4) is constituted by the coating of implant components made of biocompatible polymers such as polyetheretherketone (PEEK).

A fine titanium powder of size 75-200 microns is used as a feedstock, and the plasma spray gun receives a controlled mixture of helium and argon as it is powered by a power unit able to generate 14 kW.

The working chamber 3 is filled initially with argon at a pressure of 1.1 bar.

The first fraction of the recirculating inert gases is cooled down to 10-20° C. and supplied into the working chamber 3 again.

The second fraction of the inert gases is compressed and cooled down to 10-20° C. and directed toward the polymer substrate at a final flow rate of 800-1000 $Nm^3/h$. The highly-porous coating has a final thickness of 300-500 μm.

Figure 4:
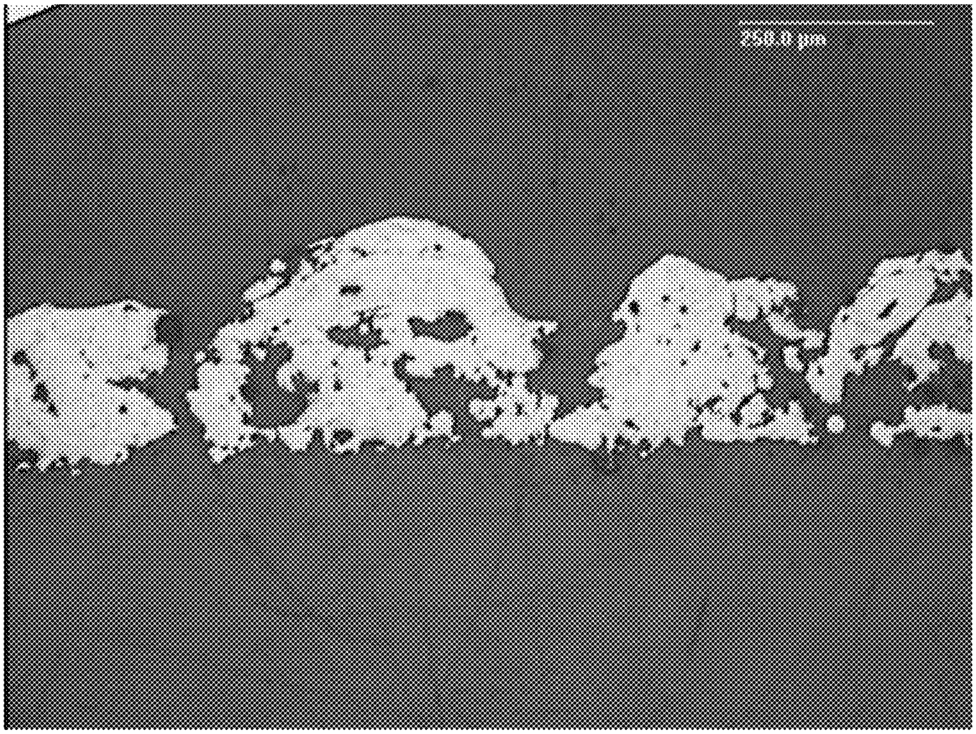
FIG. 4 is a cross-section micrograph of an application example of a polymeric coated object obtained by the apparatus and method according to the present invention.

FIG. 4 shows a cross-section micrograph of a PEEK object coated according to the above-cited conditions.

Compared to conventional VPS and LPPS processes, the apparatus and method according to the present invention allows a higher flow rate of the cooling inert gases, that is a higher cooling capability, since the working atmosphere is close to, or higher than, the normal pressure.

The very high flow rate that can be reached by the recirculating means R according to the present invention would not be sustainable—from an economic point of view—if using disposable inert gases.

Furthermore, such high flow rates would not be possible in VPS or LPPS systems because of the low pressure inside their working chambers.

As stated, and according to a preferred embodiment of the present invention, argon is used as a cooling inert gas, and a mixture of argon and helium is used for generating the plasma jet.

After exiting the plasma torch, the plasma gas mixture diffuses into the working chamber 3 atmosphere, thus enriching the atmosphere with helium.

The inert gases of the working atmosphere are continuously pumped out of the working chamber 3, recirculated and used as a cooling medium.

Since helium has a high cooling capability (higher than argon, nitrogen, and air) the presence of helium in the cooling recirculated gas further increases the efficiency of the cooling process.

The higher cooling capability allows to substantially reduce the pause between the deposition of two subsequent coating layers, that is, to reduce the duration of the coating process.

Furthermore, the higher cooling capability allows the use of more cost-effective silicone masking tapes, as those currently used in APS processes, instead of the expensive metallic masking covers used in VPS processes.

Additionally, the present invention is capable of producing high quality coatings as in VPS or LPPS processes, because the working environment does not contain neither oxygen nor nitrogen.

As evidence of these advantages, a series of experiments are carried out on thin titanium plates (100×25×1.5 mm) which are subjected to plasma spray with titanium powder under different conditions. As in the previous two examples, this combination of materials is useful for creating osseointegrating coatings for medical implant components.

Thermal strips are used to record the maximum temperature reached during the experiments. Thermal strips are self-adhesive labels that consist of a series of temperature-sensitive elements. Each element turns from white to black as its rated temperature is exceeded. The change is irreversible, providing a record of the maximum temperature.

Various different thermal strips, forming a final temperature scale from 46° C. to 260° C., are attached to one side of the titanium plate and subsequently protected by a 1.5 mm thick thermal insulating silicone tape. The other side of the plate is left uncovered. In this way, the thermal strips record the maximum temperature that is reached at a position 1.5 mm below the coated surface.

In all tests performed, the sprayed powder is made of pure titanium with a grain size of 75-250 microns. Chemically, the powder has a content of carbon ≤0.08 weight %, iron ≤0.5 wt %, hydrogen ≤0.05 wt %, nitrogen ≤0.05 wt %, oxygen ≤0.4 wt %.

In order to simulate real production conditions, the process time measured during the experiments is divided by the number of pieces which can be coated during the same coating run, thus obtaining a "process time per piece". The working chamber may contain in fact more than one substrate support. Since the number of pieces that can be placed in the working chamber also depends on their geometry and dimensions, all experiments are carried out considering the same type of piece for every test. Finally, the calculated process time per piece is normalized to the value obtained in the APS system, taken as reference.

For the sake of simplicity, the process time does not however take into account the time needed for loading/unloading the pieces into/from the working chamber or the pass-through chamber. The loading/unloading phase is generally very quick for APS systems, since they operate in normal air environment. For systems working in an inert environment with a pass-through chamber it is generally 2-4 times slower, while for systems working in an inert environment without a pass-through chamber it is considerably more time-consuming.

The results of the experiments are summarized in Table 1 below.

TABLE 1

| | COLUMN | | | | | | | | | | |
|---|---|---|---|---|---|---|---|---|---|---|---|
| Test no. | A Process system | B Chamber atmosphere | C Chamber pressure (bar) | D Cooling medium | E Cooling medium flow rate (before entering the working chamber; $Nm^3/h$) | F Relative process time (per piece; APS = 1) | G Fraction of total process time with torch on-hold (pause) | H Maximum temperature in the substrate, as recorded by thermal strip (° C.) | I Content of oxygen and nitrogen in the coating (weight-%) | J Coating thickness (microns) | K Coating porosity (%) |
| 1 | APS | air | 1 | air | 75 | 1.00 | 2.4% | 93 | O = 2.7; N = 1.0 | 340 | 30% |
| 2 | APS | air | 1 | air | 36 | 1.00 | 2.4% | 160 | n.m. | 340 | n.m. |
| 3 | VPS | argon | 0.14 | — | — | 1.80 | 3.1% | >260 | O = 0.78; N = 0.08 | 400 | 50% |
| 4 | VPS | argon | 0.9 | — | — | 0.55 | 3.4% | >260 | O = 0.30; N = 0.06 | 500 | 64% |
| 5 | VPS | argon | 0.9 | — | — | 0.71 | 34.8% | 230 | O = 0.30; N = 0.06 | 500 | n.m. |
| 6 | PRESENT APPARATUS, EXPERIMENTAL CONDITION | argon | 1.3 | argon | 15 | 0.74 | 5.9% | >260 | n.m. | 500 | n.m. |
| 7 | PRESENT APPARATUS, EXPERIMENTAL CONDITION | argon | 1.3 | argon | 15 | 1.04 | 33.3% | 171 | n.m. | 650 | n.m. |
| 8 | PRESENT APPARATUS, EXPERIMENTAL CONDITION | argon | 1.3 | argon | 66 | 0.72 | 3.0% | 182 | n.m. | 500 | n.m. |

TABLE 1-continued

| Test no. | A Process system | B Chamber atmosphere | C Chamber pressure (bar) | D Cooling medium | E Cooling medium flow rate (before entering the working chamber; $Nm^3/h$) | F Relative process time (per piece; APS = 1) | G Fraction of total process time with torch on-hold (pause) | H Maximum temperature in the substrate, as recorded by thermal strip (° C.) | I Content of oxygen and nitrogen in the coating (weight-%) | J Coating thickness (microns) | K Coating porosity (%) |
|---|---|---|---|---|---|---|---|---|---|---|---|
| 9 | PRESENT APPARATUS, PREFERRED CONDITION | argon | 1.13 | argon | 318 | 0.74 | 4.4% | 110 | O = 0.27; N = 0.06 | 500 | 65% |
| 10 | PRESENT APPARATUS, PREFERRED CONDITION | argon | 1.13 | argon | 318 | 1.00 | 4.5% | 110 | O = 0.27; N = 0.06 | 700 | 65% |

(n.m. = not measured)

The flow rate values of the cooling medium (column E) are related to the flow of the cooling medium in the ducts before entering the spray chamber, thus without considering the flow amplification effect of the nozzles.

Test no. 1 relates to the APS process carried out in air at normal ambient pressure and is taken as benchmark for evaluating process times and temperatures in the other experiments. As a reference, its process time is set to 1.00 (column F).

With a flow rate of cooling air of about 75 $Nm^3/h$, the maximum temperature is around 93° C. (column H). As explained, when the substrate temperature is kept on such low level, the thermal stresses are reduced and the mechanical properties and fatigue resistance of the substrate are preserved.

In the APS process, the fraction of pauses (column G) is kept at a minimum level, less than 3% of the total process time. Because of the air environment, the APS coating contains a certain amount of oxygen and nitrogen (column I) and its thickness must be limited to values below 350-400 microns (column J), otherwise it gets too brittle. Its porosity is also limited to 30% (column K).

Test no. 2 shows the effect of decreasing the flow rate of cooling air: with ca. half of the cooling capacity (36 $Nm^3/h$, test no. 2), the max. temperature accordingly rises up to 160° C.

Tests no. 3 to 5 are related to two different VPS coating processes.

Test no. 3 is related to a slow process carried out in a low-pressure environment. Without cooling medium and if the fraction of pauses is kept at a minimum level, the temperature reaches values above 260° C., most likely even higher than 300° C. (all thermal strips are molten or burnt). The relative process time of 1.80 indicates that this process takes 1.80 times more than the APS system to coat the same number of pieces.

Under these conditions, not only the process induce much higher temperatures but it is also already less productive than the previous APS coating system. Persons having ordinary skills in the matter know that long pauses must be set in such low-pressure systems in order to decrease the temperature and to lower the risk of distortion and internal stresses, which in turn makes this system even slower.

Test no. 4 is related to a rapid process carried out in an inert environment at a light sub-normal pressure. The relative process time is almost the half of the APS system, yet, with no cooling medium the temperature rises over 260° C.

With a higher fraction of pauses (test no. 5, pauses set to 34.8%) the relative process time increases up to 0.71, but the temperature still reaches 230° C. Longer pauses should be set in order to further decrease the temperature, which makes the process even slower.

A positive outcome of VPS processes is evidenced by the higher purity of the coatings: the levels of oxygen and nitrogen in tests no. 3 and 4 are much lower than in test no. 1. Their presence in the final coating is mostly related to their presence in the initial titanium powder. The coatings possess higher cohesion and adhesion to the substrate and both thickness and porosity can be increased.

Tests no. 6 to 10 are performed with the present apparatus under different conditions. All tests are carried out in an argon environment at a pressure slightly above the normal pressure, and the inert gas (argon) is recycled, compressed and cooled according to the scheme of FIG. 1.

In test no. 6, only a low flow rate of argon is set as cooling medium. With the minimum amount of pauses the temperature of the substrate still exceeds 260° C., since the cooling medium is not very effective yet. By increasing the fraction of the pauses up to 33.3% (test no. 7), the cooling medium acts for a longer time and the temperature can be reduced down to 171° C. However, the relative process time increases (from 0.74 to 1.04).

On the other hand, if the flow rate is increased from 15 to 66 $Nm^3/h$ (test no. 8) and the fraction of pauses is kept at the minimum level, the relative process time remains around 0.72 and the temperature is reduced to 182° C.

With the present apparatus, the flow rate of the cooling gas can be further increased and in test no. 9, representing one of the preferred combinations, it is set to 318 $Nm^3/h$. The fraction of pauses can be kept at a minimum level so that the relative process time remains around 0.74. In this case, the maximum temperature is 110° C. One may compare test no. 9 with test no. 5: both processes produce coatings with high purity, similar thickness and high porosity. The relative process times are similar as well, but while in test no. 5 the piece is heated up to 230° C., in test no. 8 the temperature is limited to 110° C.

Thicker coating can also be obtained, as in test no. 10. This condition represents the example depicted in the enclosed figure number 3. Of course the process takes longer because more successive coating layers must be deposited, but it still as productive as the reference APS test no. 1. Yet, compared to APS, higher purity and porosity are achieved, which makes the coating more effective with respect to the osseointegration.

The apparatus and method of the present invention is therefore simultaneously capable of producing:

- high quality coatings, thanks to the fact that the coating process takes place in an inert gas environment;
- with a low impact on the substrates in terms of fatigue resistance and dimensional modifications, thanks to the lower heat exposure of the parts under coating;
- with a high productivity, that is a reduced coating process duration, thanks to the use of the pass-through chamber 7 and, compared to VPS and LPPS systems, thanks to the increased cooling efficiency.

It was thus seen that the invention achieves the proposed purposes.

The proposed technical solution is constructively simple and cheap, and can be installed also onto already working apparatuses.

The present invention was described according to preferred embodiments, but equivalent variants can be conceived without departing from the protective scope offered by the following claims.

The invention claimed is:

1. A thermal plasma spray method for coating substrates, comprising the steps of:

- providing at least a working chamber including at least a plasma torch and at least a substrate support for the substrate to be coated, in which an inert gas or a mixture of inert gases is contained at a pressure which is equal to, or higher than, atmospheric pressure,
- providing at least a gas circuit, in communication with said working chamber, comprising recirculating means of the inert gases contained in said working chamber,
- performing thermal plasma spray coating on the substrate using the plasma torch,
- said recirculating means comprising a closed loop, including a first heat exchanger and a recirculating blower arranged upstream of said first heat exchanger and communicating with said working chamber, said recirculating blower extracting the inert gas or the mixture of inert gases from said working chamber, and said heat exchanger cooling down the extracted inert gas or the mixture of inert gases,
- supplying a first fraction of recirculated and cooled inert gas or mixture of inert gases into a first gas inlet of the working chamber, and
- wherein said recirculating means further comprises a path communicating with said closed loop downstream of the first heat exchanger, said path including a second heat exchanger, and at least a compressor, arranged upstream of said second heat exchanger, said compressor compressing a second fraction of said recirculated and cooled inert gas or mixture of inert gases, and said second heat exchanger cooling down the compressed second fraction of inert gas or mixture of inert gases,
- supplying said second fraction of recirculated, compressed and further cooled inert gas or mixture of inert gases into a second gas inlet of said working chamber,
- wherein the second gas inlet communicates with one or more conduits in said working chamber, said one or more conduits pointing said second fraction of recirculated, compressed and further cooled inert gas or mixture of inert gases towards the substrate,
- wherein outlets of said one or more conduits comprise air amplifiers geometrically configured to increase the flow rate of gases or mixture of gases.

2. The method according to claim 1, in which said first fraction of recirculated inert gases is cooled down to a temperature of 5-40° C.

3. The method according to claim 1, in which said second compressed fraction of recirculated inert gases is cooled down to a temperature below 40° C.

4. The method according to claim 1, in which said second fraction of recirculated inert gases is compressed to a pressure above 2 bar.

5. The method according to claim 1, in which said second fraction of recirculated, cooled inert gases is directed towards the substrate (S) flowing out of said air amplifiers of said outlets at a flow rate of 250-1000 $Nm^3/h$.

6. The method according to claim 1, in which the cooled inert gas is argon.

7. The method according to claim 1, in which a plasma jet emanates from the plasma torch and is generated using a mixture of argon and helium.

8. The method according to claim 1, further comprising a pass-through chamber communicating with the working chamber, said pass-through chamber comprising a door for loading and unloading the substrates.

9. The method according to claim 8, further comprising a gate between the pass-through chamber and the working chamber.

10. The method according to claim 9, further comprising the steps of:

- opening the door of the pass-through chamber;
- placing at least one substrate to be coated inside said pass-through chamber and closing the door;
- pumping out air in the pass-through chamber;
- back-filling the pass-through chamber through an inert gas inlet opening;
- opening the gate between the working chamber and the pass-through chamber;
- moving the at least one substrate to be coated into the working chamber and at the same time, moving previously coated substrates from the working chamber to the pass-through chamber.

* * * * *